US012802966B2

(12) United States Patent
Wu et al.

(10) Patent No.: US 12,802,966 B2
(45) Date of Patent: Nov. 17, 2026

(54) ELECTRODE PLATE AND PREPARATION METHOD THEREOF, SECONDARY BATTERY, BATTERY MODULE, BATTERY PACK, AND ELECTRIC APPARATUS

(71) Applicant: CONTEMPORARY AMPEREX TECHNOLOGY (HONG KONG) LIMITED, Hong Kong (CN)

(72) Inventors: Lili Wu, Ningde City (CN); Miaomiao Dong, Ningde City (CN); Xin Sun, Ningde City (CN); Xingbu Chen, Ningde City (CN); Xuan Li, Ningde City (CN); Liang Yun, Ningde City (CN); Peidong Song, Ningde City (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 561 days.

(21) Appl. No.: 18/359,082

(22) Filed: Jul. 26, 2023

(65) Prior Publication Data

US 2023/0369562 A1 Nov. 16, 2023

Related U.S. Application Data

(63) Continuation of application No. PCT/CN2022/092225, filed on May 11, 2022.

(51) Int. Cl.
*H01M 4/58* (2010.01)
*H01M 4/04* (2006.01)
(Continued)

(52) U.S. Cl.
CPC ......... *H01M 4/133* (2013.01); *H01M 4/0404* (2013.01); *H01M 4/1393* (2013.01);
(Continued)

(58) Field of Classification Search
CPC ........ H01M 4/133; H01M 4/131; H01M 4/13; H01M 4/139; H01M 4/1393;
(Continued)

(56) References Cited

U.S. PATENT DOCUMENTS 10,020,514 B2 * 7/2018 Ramasubramanian ..................... H01M 10/058
2013/0288117 A1 10/2013 Kim et al.
(Continued)

FOREIGN PATENT DOCUMENTS

CN 100433428 C 11/2008
CN 104157827 A 11/2014
(Continued)

OTHER PUBLICATIONS

Notice of Reasons for Refusal for copending Japanese Patent Application No. 2023-542603 dated Jan. 13, 2026.
(Continued)

*Primary Examiner* — Raymond Alejandro
(74) *Attorney, Agent, or Firm* — Ladas & Parry LLP

(57) ABSTRACT

An electrode plate and a method for preparing the electrode plate, a secondary battery, a battery module, a battery pack, and an electric apparatus are described. The electrode plate includes a current collector and an active substance layer provided on at least one surface of the current collector. The active substance layer includes an active main material and a porous material. The active substance layer has pores, where the pore runs through or not through the active substance layer. Thickness of the active substance layer is x, and distance between two end openings of the pore in a direction perpendicular to the active substance layer is y, where x and y satisfy the following condition: $0.1 \leq x \leq y \leq x$.

19 Claims, 4 Drawing Sheets

(51) Int. Cl.

| | |
|---|---|
| ***H01M 4/133*** | (2010.01) |
| ***H01M 4/1393*** | (2010.01) |
| ***H01M 4/36*** | (2006.01) |
| ***H01M 4/583*** | (2010.01) |
| *H01M 4/02* | (2006.01) |

(52) U.S. Cl.

CPC ........... *H01M 4/366* (2013.01); *H01M 4/583* (2013.01); *H01M 2004/021* (2013.01); *H01M 2220/20* (2013.01)

(58) Field of Classification Search

CPC .... H01M 4/0404; H01M 4/366; H01M 4/364; H01M 4/362; H01M 4/583; H01M 4/587; H01M 2004/021; H01M 2220/20

See application file for complete search history.

(56) References Cited

U.S. PATENT DOCUMENTS

| | | | | |
|---|---|---|---|---|
| 2021/0240743 | A1 | 8/2021 | Kotani et al. | |
| 2022/0223876 | A1* | 7/2022 | Li | H01M 4/131 |
| 2023/0034617 | A1* | 2/2023 | Liao | H01M 4/625 |

FOREIGN PATENT DOCUMENTS

| | | | |
|---|---|---|---|
| CN | 105914371 | A | 8/2016 |
| CN | 111725479 | A | 9/2020 |
| CN | 111900353 | A | 11/2020 |
| CN | 111933951 | A | 11/2020 |
| CN | 113659111 | A | 11/2021 |
| CN | 113725413 | A | 11/2021 |
| CN | 113745463 | A | 12/2021 |
| CN | 113921753 | A | 1/2022 |
| CN | 114512633 | A | 5/2022 |
| JP | 2007250469 | A | 9/2007 |
| JP | 2012190625 | A | 10/2012 |
| JP | 2015050280 | A | 3/2015 |
| JP | 6465229 | B1 | 2/2019 |
| WO | 2013/012334 | A1 | 1/2013 |
| WO | 2021251904 | A1 | 12/2021 |

OTHER PUBLICATIONS

Japanese Grant Notice for copending Application No. 10-2023-7022710 dated Apr. 10, 2026.

EPO Communication for copending aplication 22 912 786.5 dated Mar. 13, 2026.

Notice of Reasons for Refusal for Japan Patent Application No. 2023-542603, dated Sep. 30, 2024, 3 pages.

Office Action dated Jun. 18, 2025 for application KR 10-2023-7022710.

Notice of Final Rejection dated Sep. 11, 2025 for application KR 10-2023-7022710.

Nemani, V.P. et al., Design of Bi-Tortuous, Anisotropic Graphite Anodes for Fast Ion-Transport in Li-Ion Batteries, J. Electrochem. Soc., vol. 162, No. 8, May 6, 2015, A1415-A1423, 9 pages.

Extended European Search Report for Application No. PCT/CN2022/092225, mailed on Mar. 19, 2025, 13 pages.

Japan Office Action for Application No. 2023-542603, mailed on Apr. 1, 2024, 3 pages.

Extended European Search Report for Application No. EP 22912786.5, mailed on Mar. 19, 2025, 13 pages.

International Search Report dated Jan. 18, 2023 for Application No. PCT/CN2022/092225.

Japanese Office Action dated Sep. 16, 2025 for application JP 2023-542603.

Chinese Office Action for copending application 202280044793.X dated Jul. 2, 2026.

Chinese Notice of Grant for copending application 2023-542603 dated Jul. 14, 2026.

* cited by examiner

ELECTRODE PLATE AND PREPARATION METHOD THEREOF, SECONDARY BATTERY, BATTERY MODULE, BATTERY PACK, AND ELECTRIC APPARATUS

CROSS-REFERENCE TO RELATED APPLICATIONS

This application is a continuation of International application PCT/CN2022/092225 filed on May 11, 2022, the subject matter of which is incorporated by reference in its entirety herein

TECHNICAL FIELD

This application relates to the field of secondary batteries and specifically to an electrode plate and a preparation method thereof, a secondary battery, a battery module, a battery pack, and an electric apparatus.

BACKGROUND

Secondary batteries such as lithium-ion batteries, with their advantages in high energy density, good cycling performance, high average output voltage, and the like, have been widely used as power sources in electric apparatuses. With the development of electric vehicles, large energy storage devices, and other fields, higher requirements are imposed on energy density of secondary batteries. In conventional technologies, higher energy density is achieved by increasing coating weights of electrode plates, but this usually extends transmission paths of lithium ions and leads to deterioration in electrochemical performance of secondary batteries.

SUMMARY

In view of the foregoing problem, this application provides an electrode plate and a preparation method thereof, a secondary battery, a battery module, a battery pack, and an electric apparatus, so as to improve rate performance of the secondary battery, reduce impedance of the electrode plate, and improve electrochemical performance of the secondary battery.

According to a first aspect, this application provides an electrode plate including:

- a current collector; and
- an active substance layer, the active substance layer being provided on at least one surface of the current collector, the active substance layer including an active main material and a porous material, and the active substance layer having pores, where the pore runs through or not through the active substance layer, thickness of the active substance layer is x, and distance between two end openings of the pore in a direction perpendicular to the active substance layer is y, where x and y satisfy the following condition: $0.1x \le y \le x$.

According to the electrode plate, the active substance layer includes the porous material, the active substance layer has the pore with a specified depth, and the pore runs through or not through the active substance layer. The active substance layer has the pore, which facilitates liquid-phase transmission of an electrolyte and shortens transmission paths of lithium ions, thus reducing the impedance of the electrode plate. Therefore, a secondary battery using the electrode plate can have both high rate performance and low impedance.

In some embodiments, length between the two end openings of the pore along an inner wall of the pore is L, where L and y satisfy the following condition: $L > y$.

In some embodiments, the pore is a non-linear pore.

In some embodiments, a projection of interior of the pore on the current collector in the direction perpendicular to the active substance layer does not overlap with the two end openings of the pore.

In some embodiments, there are a plurality of pores, and distance between adjacent two of the pores is d, where $d \le 10\times$.

In some embodiments, a maximum diameter of the pore is 1 μm-50 μm.

In some embodiments, the porous material is a porous carbon material.

In some embodiments, the porous carbon material is selected from at least one of hard carbon, biomass carbon, activated carbon, carbon fibers, and carbon aerogel.

In some embodiments, $D_v50$ of the porous material is 1 μm-100 μm.

In some embodiments, $D_v50$ of the porous material is 1 m-20 μm.

In some embodiments, a specific surface area of the porous material in a carbon dioxide atmosphere is greater than or equal to 50 $m^2/g$.

In some embodiments, an oil absorption value of the porous material is greater than or equal to 30 mL/100 g, where the oil absorption value is determined using the Gardner-Coleman method.

In some embodiments, a ratio of a specific surface area of the electrode plate in a carbon dioxide atmosphere to a specific surface area of the electrode plate in a nitrogen atmosphere is greater than or equal to 3.

In some embodiments, in the active substance layer, a mass percentage of the porous material is 0.1%-20%.

In some embodiments, the electrode plate is a negative electrode plate.

In some embodiments, the active substance layer includes a first subordinate active layer and a second subordinate active layer that are stacked on the current collector, where the first subordinate active layer is located between the current collector and the second subordinate active layer, the first subordinate active layer includes the porous material, the second subordinate active layer includes the active main material, and the pore traverses both the first subordinate active layer and the second subordinate active layer and runs through the second subordinate active layer.

In some embodiments, a thickness ratio of the first subordinate active layer to the second subordinate active layer is (1-100):100.

In some embodiments, a thickness ratio of the first subordinate active layer to the second subordinate active layer is (5-50):100.

According to a second aspect, this application provides a preparation method of electrode plate, including the following step:

- preparing an active substance layer on at least one side surface of a current collector,
- the active substance layer including an active main material and a porous material, and the active substance layer having pores, where the pore runs through or not through the active substance layer, thickness of the active substance layer is x, and distance between two end openings of the pore in a direction perpendicular to the active substance layer is y, where x and y satisfy the following condition: $0.1x \le y \le x$.

The foregoing preparation method of electrode plate features simple processes and low preparation costs and is easy to implement mass production, and the prepared electrode plate has high rate performance, low impedance, and good electrochemical performance.

In some embodiments, the step of preparing an active substance layer on at least one side surface of a current collector includes:

pretreating the porous material so that the porous material adsorbs gas;

preparing a slurry from the active main material and the porous material; and applying the slurry on at least one side surface of the current collector.

In some embodiments, the step of preparing an active substance layer on at least one side surface of a current collector includes:

preparing a first subordinate active layer on at least one side surface of the current collector, the first subordinate active layer including the porous material with gas adsorbed; and preparing a second subordinate active layer on a surface of the first subordinate active layer away from the current collector, the second subordinate active layer including the active main material.

In some embodiments, before the step of preparing a second subordinate active layer on a surface of the first subordinate active layer away from the current collector, the preparation method further includes:

pretreating the current collector on which the first subordinate active layer is prepared so that the porous material of the first subordinate active layer adsorbs gas.

According to a third aspect, this application further provides a secondary battery including at least one of the foregoing electrode plate and an electrode plate prepared by using the foregoing preparation method of negative electrode plate.

According to a fourth aspect, this application further provides a battery module including the foregoing secondary battery.

According to a fifth aspect, this application further provides a battery pack including the foregoing battery module.

According to a sixth aspect, this application further provides an electric apparatus including at least one of the foregoing secondary battery, battery module, and battery pack.

Details of one or more embodiments of this application are presented in the following accompanying drawings and descriptions, and other features, objectives, and advantages of this application become apparent from the specification, accompanying drawings, and claims.

Figure 1:
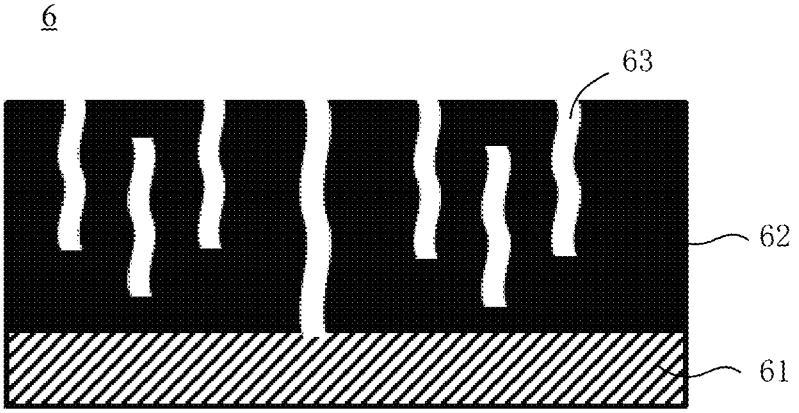
FIG. 1 is a schematic structural diagram of an electrode plate according to an embodiment of this application.

Reference signs: 1. battery pack; 2. upper box body; 3. lower box body; 4. battery module; 5. secondary battery; 51. housing; 52. electrode assembly; 53. cover plate; 6. electrode plate; 61. current collector; 62. active substance layer; 621. first subordinate active layer; 622. second subordinate active layer; and 63. pore.

To better describe and illustrate the embodiments and/or examples of those inventions disclosed herein, reference may be made to one or more accompanying drawings. The additional details or examples used to describe the accompanying drawings should not be considered as any limitations on the scope of any of the disclosed inventions, the embodiments and/or examples currently described, and the best mode of these inventions as currently understood.

DESCRIPTION

For ease of understanding this application, this application is described more comprehensively below with reference to the relevant accompanying drawings. The accompanying drawings show preferred embodiments of this application. However, this application may be implemented in many different manners and is not limited to the embodiments described herein. Conversely, these embodiments are provided for a more thorough and comprehensive understanding of the disclosed content of this application.

Unless otherwise defined, all technical and scientific terms used herein shall have the same meanings as commonly understood by persons skilled in the art to which this application pertains. The terms used herein in the specification of this application are for description of specific embodiments only without any intention to limit this application. The term "and/or" used herein includes any and all combinations of one or more associated items listed.

With the development of electric vehicles, large energy storage devices, and other fields, higher requirements are imposed on energy density of secondary batteries. In conventional technologies, higher energy density is achieved by increasing coating weights of electrode plates. However, although the increase in the coating weight of the electrode plate can improve capacity and energy density of the secondary battery, this affects electrolyte infiltration performance of the electrode plate and extends transmission paths of lithium ions, thus increasing the impedance of the electrode plate and leading to deterioration in the electrochemical performance of the secondary battery.

To alleviate the foregoing problems, pores are typically formed in the electrode plate to increase the porosity of the electrode plate, thereby improving internal resistance of the electrode plate. However, conventional methods such as mechanical pore formation lose many active materials, and a pore structure obtained by volatilization or decomposition of a pore formation agent for forming pores has poor stability and its residues may affect the electrical performance.

The inventors have found through research that the porous material introduced into the electrode plate and having a large specific surface area can adsorb gas easily, and the gas adsorbed can be desorbed to form abundant pore structures in the active substance layer during preparation of the electrode plate, which can effectively improve electrolyte infiltration of the electrode plate and transmission of lithium ions.

This application provides an electrode plate and a preparation method thereof, and a secondary battery, battery module, battery pack, and electric apparatus using such electrode plate. Such secondary battery is applicable to various electric apparatuses that use batteries, for example, mobile phones, portable devices, notebook computers, electric bicycles, electric toys, electric tools, electric vehicles, ships, and spacecrafts. For example, spacecrafts include airplanes, rockets, space shuttles, and spaceships.

Referring to FIG. 1, an embodiment of this application provides an electrode plate 6. The electrode plate 6 includes a current collector 61 and an active substance layer 62.

Figure 2:
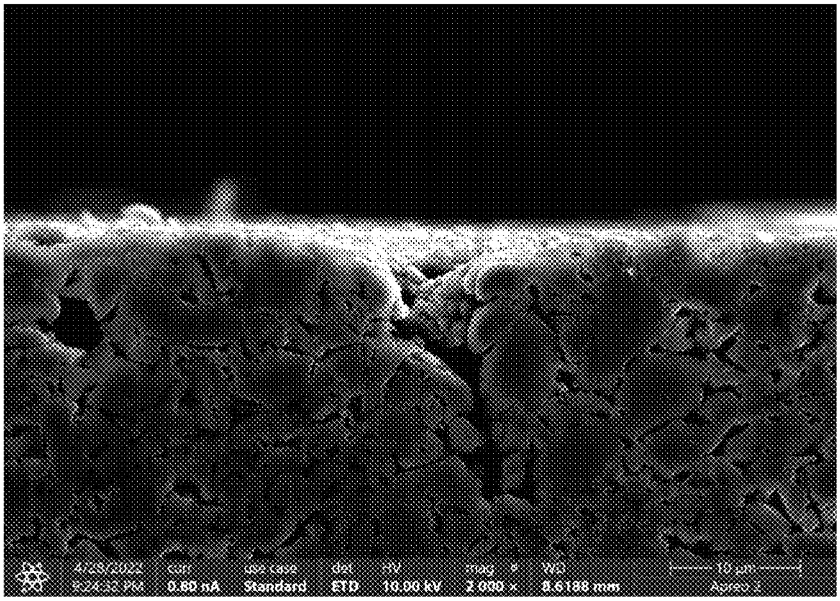
FIG. 2 is a scanning electron microscope (SEM) image of a cross section of an electrode plate according to an embodiment of this application.

The active substance layer 62 is provided on at least one surface of the current collector 61, the active substance layer 62 includes an active main material and a porous material, and the active substance layer 62 has pores 63, where the pore 63 runs through or not through the active substance layer 62, thickness of the active substance layer 62 is x, and distance between two end openings of the pore 63 in a direction perpendicular to the active substance layer 62 is y, where x and y satisfy the following condition: $0.1x \le y \le x$. Referring to FIG. 2, FIG. 2 is a scanning electron microscope (SEM) image of a cross section of an electrode plate 6 according to an embodiment of this application. It can be seen that the active substance layer 62 of the electrode plate 6 has pores 63.

According to the electrode plate 6, the active substance layer 62 includes the porous material, the active substance layer 62 has the pore 63 with a specified depth, and the pore 63 runs through or not through the active substance layer 62. The active substance layer 62 has the pore 63, which facilitates liquid-phase transmission of an electrolyte and shortens transmission paths of lithium ions, thus reducing the impedance of the electrode plate 6. Therefore, a secondary battery using the electrode plate can have both high rate performance and low impedance.

Specifically, the active main material is an active material in the electrode plate 6. If the electrode plate 6 is a positive electrode plate, the active main material is a positive electrode active material; or if the electrode plate 6 is a negative electrode plate, the active main material is a negative electrode active material.

In some embodiments, length between the two end openings of the pore 63 along an inner wall of the pore 63 is L, where L and y satisfy the following condition: L>y. It can be understood that the distance between the two end openings of the pore 63 may not be perpendicular to the surface of the negative electrode active substance layer 62, or the pore 63 is non-linear and tortuous.

In some embodiments, the pore 63 is a non-linear pore 63. The non-linear pore 63 having a longer transmission path increases the specific surface area of the electrode plate 6 and can further improve electrolyte infiltration of the electrode plate 6 and shorten transmission paths of lithium ions.

In some embodiments, any projection of interior of the pore 63 on the current collector 61 in the direction perpendicular to the active substance layer 62 does not overlap with two end openings of the pore 63. The projection of interior of the pore 63 on the current collector 61 in the direction perpendicular to the active substance layer 62 does not completely overlap with two end openings of the pore 63, that is, the pore 63 is tortuous. The electrode plate 6 has abundant pore 63 structures, facilitating electrolyte infiltration and reducing internal resistance of the electrode plate 6.

Figure 3:
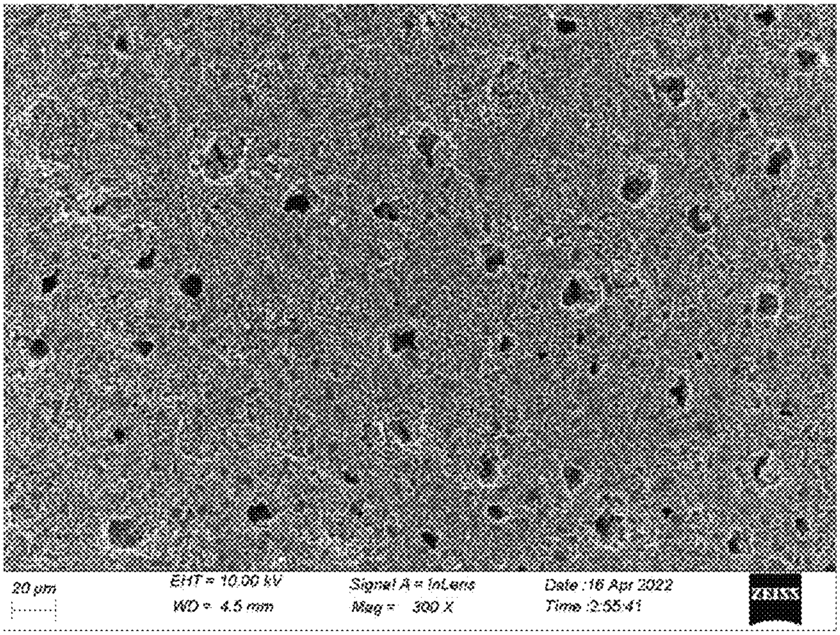
FIG. 3 is a scanning electron microscope (SEM) image of a surface of an electrode plate according to an embodiment of this application.

In some embodiments, there are a plurality of pores 63, and distance between adjacent two of the pores 63 is d, where $d \le 10x$. The pores 63 of the electrode plate 6 are distributed in a density range of less than or equal to 10x, which can ensure that the electrode plate 6 has a large quantity of pores 63, thereby guaranteeing electrolyte infiltration and transmission of lithium ions and reducing the internal resistance of the electrode plate 6. Referring to FIG. 3, FIG. 3 is a scanning electron microscope (SEM) image of a surface of an electrode plate 6 according to an embodiment of this application. It can be seen that a plurality of pore structures are provided on the surface of the active substance layer 62 of the electrode plate 6.

In some embodiments, a maximum diameter of the pore 63 is 1 μm-50 μm. The maximum diameter of the pore 63 of the electrode plate 6 is distributed in the foregoing range, facilitating improvement of electrolyte infiltration and transmission of lithium ions and reducing the internal resistance of the electrode plate 6. The maximum diameter of the pore 63 is a major axis diameter of the pore on the surface of the electrode plate. Optionally, the maximum diameter of the pore 63 is 1 μm-10 μm, 10 μm-20 μm, 20 μm-30 μm, 30 μm-40 μm, or 40 μm-50 μm.

In some embodiments, the porous material is a porous carbon material.

In some embodiments, the porous carbon material is selected from at least one of hard carbon, biomass carbon, activated carbon, carbon fibers, and carbon aerogel. When applied to the electrode plate 6, the porous carbon material having a large specific surface area can improve porosity of a negative electrode plate. Moreover, when the gas adsorbed in pores of the porous carbon material is desorbed, the pore 63 structure of the electrode plate 6 can be formed. In particular, when the electrode plate 6 is a negative electrode plate, the porous carbon material is also used as a negative electrode active material, which can further improve energy density of the negative electrode plate.

In some embodiments, $D_v50$ of the porous material is 1 μm-100 μm. $D_v50$ refers to a particle size corresponding to 50% in volume distribution. For example, $D_v50$ may be easily determined in accordance with a particle size distribution laser diffraction method in GB/T 19077-2016 by using a laser particle size analyzer, for example, a laser particle size analyzer of Mastersizer 2000E from Malvern Instruments Ltd. of UK. Optionally, $D_v50$ of the porous material is 1 μm, 2 μm, 4 μm, 5 μm, 8 μm, 10 μm, 20 μm, 30 μm, 40 μm, 50 μm, 60 μm, 70 μm, 80 μm, 90 μm, or 100 μm. Further, $D_v50$ of the porous material is 1 μm-20 μm.

In some embodiments, a specific surface area of the porous material in a carbon dioxide atmosphere is greater than or equal to 50 $m^2/g$. The porous material has a large specific surface area and thus is able to adsorb gas, which allows the electrode plate 6 to produce abundant pore 63 structures during preparation, thereby facilitating improvement of the internal resistance of the electrode plate 6.

In some embodiments, an oil absorption value of the porous material is greater than or equal to 30 mL/100 g, where the oil absorption value is determined using the Gardner-Coleman method. A solvent used includes any one of dibutyl phthalate (DBP), dioctyl phthalate (DOP), linseed oil, deionized water, N-methylpyrrolidone, absolute ethanol, and acetone. The oil absorption value of the porous material falls within the foregoing range, which facilitates release of the gas adsorbed by the porous material for formation of the pore 63 structure of the electrode plate 6, and also facilitates improvement of electrolyte infiltration of the electrode plate 6, thereby improving kinetic performance of the secondary battery.

In some embodiments, a ratio of a specific surface area of the electrode plate 6 in a carbon dioxide atmosphere to a specific surface area of the electrode plate 6 in a nitrogen atmosphere ($BET_{CO2}/BET_{N2}$ for short) is greater than or equal to 3. Carbon dioxide having a molecular volume smaller than that of nitrogen molecules can be adsorbed more in the porous material and the pore 63 of the electrode plate 6, so the measured specific surface area of the electrode plate 6 in carbon dioxide is larger. The $BET_{CO2}/BET_{N2}$ of the electrode plate 6 is adjusted to be greater than or equal to 3, which allows the electrode plate 6 to have abundant pore 63 structures and high porosity, thereby facilitating improvement of electrolyte infiltration and transmission of lithium ions and reducing the internal resistance of the electrode plate 6. Optionally, the $BET_{CO2}/BET_{N2}$ of the electrode plate 6 is greater than or equal to 3, greater than or equal to 5, greater than or equal to 10, greater than or equal to 15, or greater than or equal to 20.

In some embodiments, in the active substance layer 62, a mass percentage of the porous material is 0.1%-20%. The mass percentage of the porous material is controlled within the foregoing range, so that appropriate pores 63 can be formed in the active substance layer 62.

Figure 4:
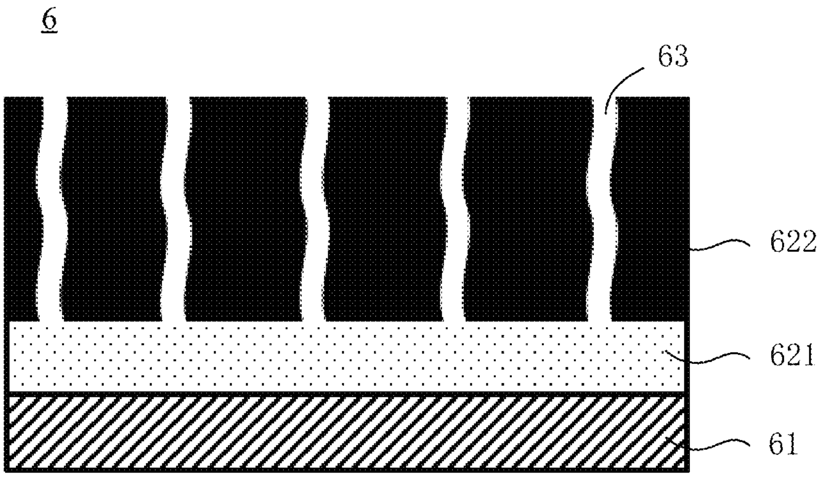
FIG. 4 is a schematic structural diagram of an electrode plate according to another embodiment of this application.

Referring to FIG. 4, FIG. 4 shows an electrode plate 6 according to an embodiment of this application. In some embodiments, the active substance layer 62 includes a first subordinate active layer 621 and a second subordinate active layer 622 that are stacked on the current collector 61, where the first subordinate active layer 621 is located between the current collector 61 and the second subordinate active layer 622, the first subordinate active layer 621 includes the porous material, the second subordinate active layer 622 includes the active main material, and the pore 63 traverses both the first subordinate active layer 621 and the second subordinate active layer 622 and runs through the second subordinate active layer 622. The first subordinate active layer 621 including the porous material is disposed between the current collector 61 and the second subordinate active layer 622, so that the pore 63 runs through the second subordinate active layer 622, which can further improve electrolyte infiltration of the electrode plate 6 and transmission of lithium ions and reduce impedance of the electrode plate 6.

In some embodiments, a thickness ratio of the first subordinate active layer 621 to the second subordinate active layer 622 is (1-100):100. The thickness ratio of the first subordinate active layer 621 to the second subordinate active layer 622 is controlled within the foregoing range, allowing the electrode plate 6 to have abundant pores 63, high porosity, low impedance, and high rate performance. Further, the thickness ratio of the first subordinate active layer 621 to the second subordinate active layer 622 is (5-50):100.

Another embodiment of this application further provides a preparation method of electrode plate, including the following step:

- preparing an active substance layer on at least one side surface of a current collector,
- the active substance layer including an active main material and a porous material, and the active substance layer having pores, where the pore runs through or not through the active substance layer, thickness of the active substance layer is x, and distance between two end openings of the pore in a direction perpendicular to the active substance layer is y, where x and y satisfy the following condition: $0.1x \leq y \leq x$.

The foregoing preparation method of electrode plate features simple processes and low preparation costs and is easy to implement mass production, and the prepared electrode plate has high rate performance, low impedance, and good electrochemical performance.

In some embodiments, the step of preparing an active substance layer on at least one side surface of a current collector includes:

- pretreating the porous material so that the porous material adsorbs gas;
- preparing a slurry from the active main material and the porous material; and
- applying the slurry on at least one side surface of the current collector.

The porous material is pretreated so that the porous material adsorbs gas, and in the subsequent steps of preparing the porous material into the slurry and applying the resulting slurry to prepare the active substance layer, the gas is desorbed from the porous material, so that the pore structure of the electrode plate is formed.

In some embodiments, the step of preparing an active substance layer on at least one side surface of a current collector includes:

- preparing a first subordinate active layer on at least one side surface of the current collector, the first subordinate active layer including the porous material with gas adsorbed; and
- preparing a second subordinate active layer on a surface of the first subordinate active layer away from the current collector, the second subordinate active layer including the active main material.

In some embodiments, before the step of preparing a second subordinate active layer on a surface of the first subordinate active layer away from the current collector, the preparation method further includes:

- pretreating the current collector on which the first subordinate active layer is prepared so that the porous material of the first subordinate active layer adsorbs gas.

The first subordinate active layer is pretreated so that the porous material adsorbs gas, and then in the subsequent step of preparing the second subordinate active layer, the gas is desorbed from the first subordinate active layer to form the pore running through the second subordinate active layer.

In addition, the following describes a secondary battery, a battery module, a battery pack, and an electric apparatus in this application with appropriate reference to the accompanying drawings.

An embodiment of this application provides a secondary battery.

Typically, the secondary battery includes a positive electrode plate, a negative electrode plate, an electrolyte, and a separator. In a charge and discharge process of the battery, active ions intercalate and deintercalate between the positive electrode plate and the negative electrode plate. The electrolyte conducts ions between the positive electrode plate and the negative electrode plate. The separator is disposed between the positive electrode plate and the negative electrode plate to mainly prevent a short circuit between positive and negative electrodes and to allow the ions to pass through. In this embodiment of this application, the positive electrode plate and/or the negative electrode plate in the secondary battery uses the electrode plate provided in the foregoing first aspect or an electrode plate prepared by using the preparation method in the foregoing second aspect.

Positive Electrode Plate

The positive electrode plate includes a positive electrode current collector and a positive electrode active substance layer provided on at least one surface of the positive electrode current collector, where the positive electrode active substance layer includes a positive electrode active material.

For example, the positive electrode current collector includes two opposite surfaces in its thickness direction, and the positive electrode active substance layer is provided on either or both of the two opposite surfaces of the positive electrode current collector.

In some embodiments, the positive electrode current collector may be a metal foil current collector or a composite current collector. For example, an aluminum foil may be used as the metal foil. The composite current collector may include a polymer material matrix and a metal layer formed on at least one surface of the polymer material matrix. The composite current collector may be formed by forming a metal material (aluminum, aluminum alloy, nickel, nickel alloy, titanium, titanium alloy, silver, silver alloy, or the like) on the polymer material matrix (for example, matrices of polypropylene (PP), polyethylene terephthalate (PET), polybutylene terephthalate (PBT), polystyrene (PS), and polyethylene (PE)).

In some embodiments, the positive electrode active material may be a positive electrode active material for batteries well known in the art. For example, the positive electrode active material may include at least one of the following: olivine-structured lithium-containing phosphate, lithium transition metal oxide, and respective modified compounds thereof. However, this application is not limited to these materials, but may use other conventional materials that can be used as positive electrode active materials for batteries instead. One of these positive electrode active materials may be used alone, or two or more of them may be used in combination. Examples of the lithium transition metal oxide may include but are not limited to at least one of lithium cobalt oxide (for example, $LiCoO_2$), lithium nickel oxide (for example, $LiNiO_2$), lithium manganese oxide (for example, $LiMnO_2$ and $LiMn_2O_4$), lithium nickel cobalt oxide, lithium manganese cobalt oxide, lithium nickel manganese oxide, lithium nickel cobalt manganese oxide (for example, $LiNi_{1/3}Co_{1/3}Mn_{1/3}O_2$ (NCM333 for short), $LiNi_{0.5}Co_{0.2}Mn_{0.3}O_2$ (NCM523 for short), $LiNi_{0.5}Co_{0.25}Mn_{0.25}O_2$ (NCM211 for short), $LiNi_{0.6}Co_{0.2}Mn_{0.2}O_2$ (NCM622 for short) and $LiNi_{0.8}Co_{0.1}Mn_{0.1}O_2$ (NCM811 for short)), lithium nickel cobalt aluminum oxide (for example, $LiNi_{0.85}Co_{0.15}Al_{0.05}O_2$), and modified compounds thereof. Examples of the olivine-structured lithium-containing phosphate may include but are not limited to at least one of lithium iron phosphate (for example, $LiFePO_4$(LFP for short)), a composite material of lithium iron phosphate and carbon, lithium manganese phosphate (for example, $LiMnPO_4$), a composite material of lithium manganese phosphate and carbon, lithium manganese iron phosphate, and a composite material of lithium manganese iron phosphate and carbon.

In some embodiments, the positive electrode active substance layer further optionally includes a binder. For example, the binder may include at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluorine-containing acrylic resin.

In some embodiments, the positive electrode active substance layer further optionally includes a conductive agent. For example, the conductive agent may include at least one of superconducting carbon, acetylene black, carbon black, Ketjen black, carbon dots, carbon nanotubes, graphene, and carbon nanofibers.

In some embodiments, the positive electrode plate may be prepared in the following manner: the foregoing constituents used for preparing the positive electrode plate, for example, the positive electrode active material, the conductive agent, the binder, and any other constituent, are dispersed in a solvent (for example, N-methylpyrrolidone) to form a positive electrode slurry; and the positive electrode slurry is applied onto the positive electrode current collector, followed by processes such as drying and cold pressing to obtain the positive electrode plate.

Negative Electrode Plate

The negative electrode plate includes a negative electrode current collector and a negative electrode active substance layer provided on at least one surface of the negative electrode current collector, where the negative electrode active substance layer includes a negative electrode active material.

For example, the negative electrode current collector includes two opposite surfaces in its thickness direction, and the negative electrode active substance layer is disposed on either or both of the two opposite surfaces of the negative electrode current collector.

In some embodiments, the negative electrode current collector may be a metal foil current collector or a composite current collector. For example, a copper foil may be used as the metal foil. The composite current collector may include a polymer material matrix and a metal layer formed on at least one surface of the polymer material matrix. The composite current collector may be formed by forming a metal material (copper, copper alloy, nickel, nickel alloy, titanium, titanium alloy, silver, silver alloy, or the like) on a polymer material matrix (for example, matrices of polypropylene (PP), polyethylene terephthalate (PET), polybutylene terephthalate (PBT), polystyrene (PS), and polyethylene (PE)).

In some embodiments, the negative electrode active material may be a negative electrode active material for batteries well known in the art. For example, the negative electrode active material may include at least one of artificial graphite, natural graphite, soft carbon, hard carbon, a silicon-based material, a tin-based material, lithium titanate, and the like. The silicon-based material may be selected from at least one of elemental silicon, silicon-oxygen compound, silicon-carbon composite, silicon-nitrogen composite, and silicon alloy. The tin-based material may be selected from at least one of elemental tin, tin-oxygen compound, and tin alloy. However, this application is not limited to these materials, but may use other conventional materials that can be used as negative electrode active materials for batteries instead. One of these negative electrode active materials may be used alone, or two or more of them may be used in combination.

In some embodiments, the negative electrode active substance layer further optionally includes a binder. The binder may be selected from at least one of styrene butadiene rubber (SBR), polyacrylic acid (PAA), polyacrylic acid sodium (PAAS), polyacrylamide (PAM), polyvinyl alcohol (PVA), sodium alginate (SA), polymethacrylic acid (PMAA), and carboxymethyl chitosan (CMCS).

In some embodiments, the negative electrode active substance layer further optionally includes a conductive agent. The conductive agent may be selected from at least one of superconducting carbon, acetylene black, carbon black, Ketjen black, carbon dots, carbon nanotubes, graphene, and carbon nanofibers.

In some embodiments, the negative electrode active substance layer further optionally includes other additives, for example, a thickener (for example, sodium carboxymethyl cellulose (CMC-Na)).

In some embodiments, the negative electrode plate may be prepared in the following manner: the constituents used for preparing the negative electrode plate, for example, the negative electrode active material, the conductive agent, the binder, and any other constituent, are dispersed in a solvent (for example, deionized water) to form a negative electrode slurry; and the negative electrode slurry is applied onto the negative electrode current collector, followed by processes such as drying and cold pressing to obtain the negative electrode plate.

Electrolyte

The electrolyte conducts ions between the positive electrode plate and the negative electrode plate. The electrolyte is not limited to any specific type in this application, and may be selected as required. For example, the electrolyte may be in a liquid state, a gel state, or an all-solid-state.

In some embodiments, the electrolyte is a liquid electrolyte. The liquid electrolyte includes an electrolytic salt and a solvent.

In some embodiments, the electrolytic salt may be selected from at least one of lithium hexafluorophosphate, lithium tetrafluoroborate, lithium perchlorate, lithium hexafluoroborate, lithium bis(fluorosulfonyl)imide, lithium bis(trifluoromethanesulphonyl)imide, lithium trifluoromethanesulfonate, lithium difluorophosphate, lithium difluoro(oxalato)borate, lithium bisoxalatoborate, lithium difluorobisoxalate phosphate, and lithium tetrafluoro oxalate phosphate.

In some embodiments, the solvent may be selected from at least one of ethylene carbonate, propylene carbonate, ethyl methyl carbonate, diethyl carbonate, dimethyl carbonate, dipropyl carbonate, methyl propyl carbonate, ethyl propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, methyl sulfonyl methane, methyl ethyl sulfone, and diethyl sulfone.

In some embodiments, the liquid electrolyte further optionally includes an additive. For example, the additive may include a negative electrode film-forming additive, a positive electrode film-forming additive, or may further include an additive capable of improving some performance of the battery, for example, an additive for improving overcharge performance of the battery, an additive for improving high-temperature performance of the battery, or an additive for improving low-temperature performance of the battery.

Separator

In some embodiments, the secondary battery further includes a separator. The separator is not limited to any specific type in this application, and may be any commonly known porous separator with high chemical stability and mechanical stability.

In some embodiments, a material of the separator may be selected from at least one of glass fiber, non-woven fabric, polyethylene, polypropylene, and polyvinylidene fluoride. The separator may be a single-layer film or a multi-layer composite film, and is not particularly limited. When the separator is a multi-layer composite film, all layers may be made of same or different materials, which is not particularly limited.

In some embodiments, the positive electrode plate, the negative electrode plate, and the separator may be made into an electrode assembly through winding or lamination.

In some embodiments, the secondary battery may include an outer package. The outer package can be used for packaging the electrode assembly and the electrolyte.

In some embodiments, the outer package of the secondary battery may be a hard shell, for example, a hard plastic shell, an aluminum shell, or a steel shell. The outer package of the secondary battery may alternatively be a soft pack, for example, a soft pouch. A material of the soft pack may be plastic. As the plastic, polypropylene, polybutylene terephthalate, polybutylene succinate, and the like may be listed.

Figure 5:
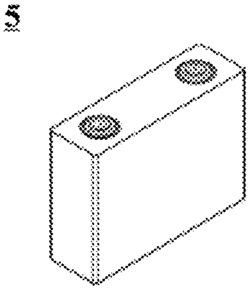
FIG. 5 is a schematic diagram of a secondary battery according to an embodiment of this application.

This application has no specific limitation on a shape of the secondary battery, and the secondary battery may be cylindrical, rectangular, or of any other shapes. For example, FIG. 5 shows a secondary battery 5 of a rectangular structure as an example.

Figure 6:
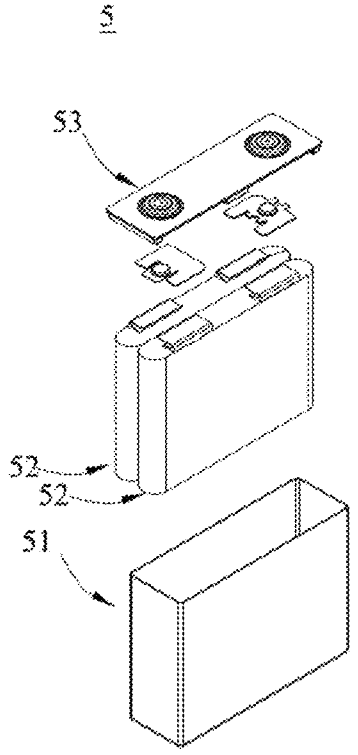
FIG. 6 is an exploded view of the secondary battery according to the embodiment of this application in FIG. 5.

In some embodiments, referring to FIG. 6, the outer package may include a housing 51 and a cover plate 53. The housing 51 may include a base plate and side plates connected to the base plate, where the base plate and the side plates enclose an accommodating cavity. The housing 51 has an opening communicating with the accommodating cavity, and the cover plate 53 can cover the opening to seal the accommodating cavity. The positive electrode plate, the negative electrode plate, and the separator may be made into an electrode assembly 52 through winding or lamination. The electrode assembly 52 is packaged in the accommodating cavity. The electrolyte infiltrates the electrode assembly 52. There may be one or more electrode assemblies 52 in the secondary battery 5, and persons skilled in the art may make choices according to actual requirements.

In some embodiments, the secondary battery may be assembled into a battery module, and the battery module may include one or more secondary batteries. The specific quantity may be chosen by persons skilled in the art based on use and capacity of the battery module.

Figure 7:
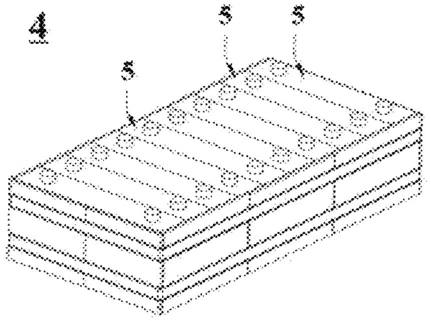
FIG. 7 is a schematic diagram of a battery module according to an embodiment of this application.

FIG. 7 shows a battery module 4 as an example. Referring to FIG. 7, in the battery module 4, a plurality of secondary batteries 5 may be sequentially arranged in a length direction of the battery module 4. Certainly, the secondary batteries 5 may alternatively be arranged in any other manner. Further, the plurality of secondary batteries 5 may be fastened by fasteners.

Optionally, the battery module 4 may further include a housing with an accommodating space, and the plurality of secondary batteries 5 are accommodated in the accommodating space.

In some embodiments, the battery module may be further assembled into a battery pack, and the battery pack may include one or more battery modules. The specific quantity may be chosen by persons skilled in the art based on use and capacity of the battery pack.

Figure 8:
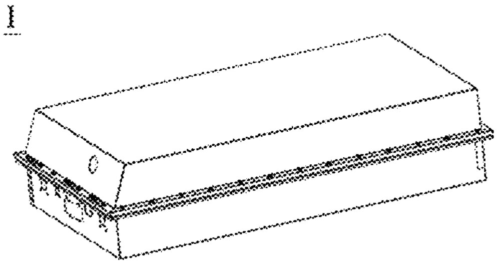
FIG. 8 is a schematic diagram of a battery pack according to an embodiment of this application.
Figure 9:
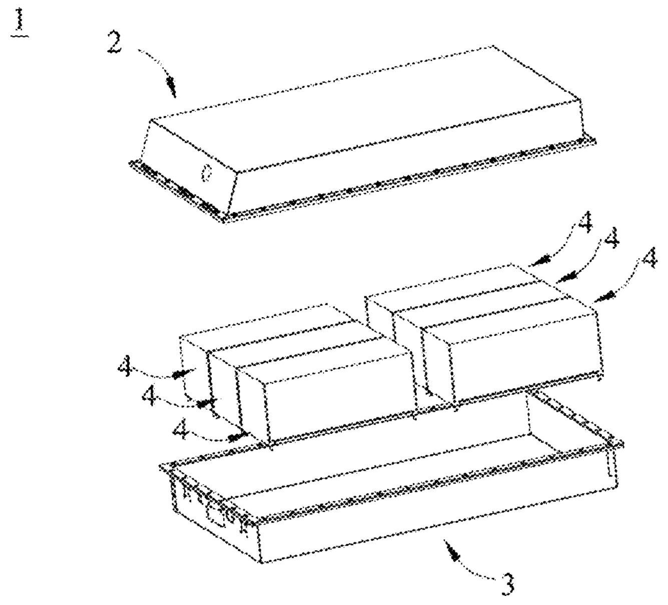
FIG. 9 is an exploded view of the battery pack according to the embodiment of this application in FIG. 8.

FIG. 8 and FIG. 9 show a battery pack 1 as an example. Referring to FIG. 8 and FIG. 9, the battery pack 1 may include a battery box and a plurality of battery modules 4 arranged in the battery box. The battery box includes an upper box body 2 and a lower box body 3. The upper box body 2 can cover the lower box body 3 to form an enclosed space for accommodating the battery module 4. The plurality of battery modules 4 may be arranged in the battery box in any manner.

In addition, this application further provides an electric apparatus. The electric apparatus includes at least one of the secondary battery, the battery module, or the battery pack provided in this application. The secondary battery, the battery module, or the battery pack may be used as a power source for the electric apparatus, or an energy storage unit of the electric apparatus. The electric apparatus may include a mobile device (for example, a mobile phone or a notebook computer), an electric vehicle (for example, a battery electric vehicle, a hybrid electric vehicle, a plug-in hybrid electric vehicle, an electric bicycle, an electric scooter, an electric golf vehicle, or an electric truck), an electric train, a ship, a satellite system, an energy storage system, or the like, but is not limited thereto.

For the electric apparatus, a secondary battery, a battery module, or a battery pack may be selected according to requirements for using the electric apparatus.

Figure 10:
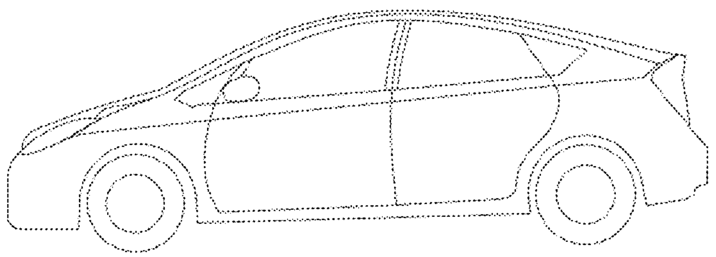
FIG. 10 is a schematic diagram of an electric apparatus using a secondary battery in an embodiment of this application as a power source.

FIG. 10 shows an electric apparatus as an example. The electric apparatus is a battery electric vehicle, a hybrid electric vehicle, a plug-in hybrid electric vehicle, or the like. To satisfy requirements of the electric apparatus for high power and high energy density of the secondary battery, a battery pack or a battery module may be used.

In another example, the apparatus may be a mobile phone, a tablet computer, a notebook computer, or the like. Such apparatus is generally required to be light and thin and may use a secondary battery as its power source.

EXAMPLES

The following describes examples of this application. The examples described below are illustrative and only used for explaining this application, and cannot be construed as limitations on this application. Examples whose technical solutions or conditions are not specified are made in accordance with technical solutions or conditions described in literature in the field or made in accordance with product instructions. The reagents or instruments used are all conventional products that are commercially available if no manufacturer is indicated.

Example 1

A negative electrode plate of this example was prepared according to the following steps:

A negative electrode active material graphite, a porous material hard carbon ($D_v50$ was 4.6 μm), a conductive agent acetylene black, a binder SBR, and a dispersing agent CMC were dispersed in deionized water at a mass ratio of 95:2:1:1:1. A resulting negative electrode slurry was applied onto a copper foil. The resulting copper foil was dried, followed by cold pressing and cutting, to obtain a negative electrode plate. A negative electrode active substance layer had a thickness of 100 μm. In the processes of drying and cold pressing, gas adsorbed in a porous material was desorbed to form a pore structure in the negative electrode active substance layer.

Example 2

A negative electrode plate of this example differed from the negative electrode plate of example 1 in that a porous material in the negative electrode plate was activated carbon ($D_v50$ was 4.6 μm).

Example 3

A negative electrode plate of this example differed from the negative electrode plate of example 1 in that a porous material in the negative electrode plate was carbon fibers ($D_v50$ was 4.6 μm).

Example 4

A negative electrode plate of this example differed from the negative electrode plate of example 1 in that a porous material in the negative electrode plate was carbon aerogel ($D_v50$ was 4.6 μm).

Example 5

A negative electrode plate of this example differed from the negative electrode plate of example 1 in that a specific surface area of hard carbon was 125.6 $m^2/g$.

Example 6

A negative electrode plate of this example differed from the negative electrode plate of example 1 in that a specific surface area of hard carbon was 394.0 $m^2/g$.

Example 7

A negative electrode plate of this example differed from the negative electrode plate of example 1 in that a specific surface area of hard carbon was 968.7 $m^2/g$.

For parameters including types, oil absorption values, and specific surface areas of the porous materials in the negative electrode plates of examples 1 to 7, refer to Table 1.

TABLE 1

Parameters including types, oil absorption values, and specific surface areas of porous materials in negative electrode plates of examples 1 to 7

| | Porous material | | |
|---|---|---|---|
| Example | Type | Oil absorption value (mL/100 g) | Specific surface area ($m^2/g$) |
| Example 1 | Hard carbon | 52 | 78.5 |
| Example 2 | Activated carbon | 48 | 90.2 |
| Example 3 | Carbon fibers | 38 | 175.7 |
| Example 4 | Carbon aerogel | 79 | 138.4 |
| Example 5 | Hard carbon | 59 | 125.6 |
| Example 6 | Hard carbon | 66 | 394.0 |
| Example 7 | Hard carbon | 75 | 968.7 |

Comparative Example 1

This comparative example differed from example 1 in that a negative electrode plate included no porous material. The negative electrode plate was prepared according to the following steps: A negative electrode active material graphite, a conductive agent acetylene black, a binder SBR, and a dispersing agent CMC were dispersed in deionized water at a mass ratio of 97:1:1:1. A resulting negative electrode slurry was applied onto a copper foil. The resulting copper foil was dried, followed by cold pressing and cutting, to obtain a negative electrode plate.

Example 8

This example differed from example 1 in that a mass ratio of a negative electrode active material graphite, hard carbon, a conductive agent acetylene black, a binder SBR, and a dispersing agent CMC was 96.9:0.1:1:1:1.

Example 9

This example differed from example 1 in that a mass ratio of a negative electrode active material graphite, hard carbon, a conductive agent acetylene black, a binder SBR, and a dispersing agent CMC was 87:10:1:1:1.

Example 10

This example differed from example 1 in that a mass ratio of a negative electrode active material graphite, hard carbon, a conductive agent acetylene black, a binder SBR, and a dispersing agent CMC was 77:20:1:1:1.

For composition proportions of the negative electrode plates of examples 1 and 8 to 10, refer to Table 2.

TABLE 2

Composition proportions of negative electrode plates of examples 1 and 8 to 10

| Example | Graphite (wt %) | Hard carbon (wt %) | Acetylene black (wt %) | SBR (wt %) | CMC (wt %) |
|---|---|---|---|---|---|
| Example 1 | 95 | 2 | 1 | 1 | 1 |
| Example 8 | 96.9 | 0.1 | 1 | 1 | 1 |
| Example 9 | 87 | 10 | 1 | 1 | 1 |
| Example 10 | 77 | 20 | 1 | 1 | 1 |

Examples 11 to 15

Hard carbon ($D_v50$ was 4.6 μm), a conductive agent acetylene black, a binder SBR, and a dispersing agent CMC were dispersed in deionized water at a specified mass ratio. A resulting first slurry was applied onto a copper foil, followed by drying and cold pressing, to prepare a first subordinate active layer. The copper foil on which the first subordinate active layer was prepared was left standing for 6 h in a carbon dioxide atmosphere so that hard carbon adsorbed carbon dioxide. A negative electrode active material graphite, a conductive agent acetylene black, a binder SBR, and a dispersing agent CMC were dispersed in deionized water at a mass ratio of 97:1:1:1. A resulting second slurry was applied onto the first subordinate active layer to prepare a second subordinate active layer. The prepared second subordinate active layer was dried, followed by cold pressing and cutting to obtain a negative electrode plate. In the processes of drying and cold pressing, gas adsorbed in hard carbon was desorbed to run through the second subordinate active layer so as to form a pore structure of a negative electrode active substance layer.

For mass percentages of hard carbon in the negative electrode plates, composition proportions of the first subordinate active layers, and thickness ratios of the first subordinate active layers to the second subordinate active layers in examples 11 to 15, refer to Table 3.

TABLE 3

Mass percentages of hard carbon in negative electrode plates, composition proportions of first subordinate active layers, and thickness ratios of first subordinate active layers to second subordinate active layers in examples 11 to 15

| Example | Mass percentage of hard carbon in electrode plate (wt %) | Composition proportion of first subordinate active layer: Hard carbon (wt %) | Acetylene black (wt %) | SBR (wt %) | CMC (wt %) | Thickness ratio of first subordinate active layer to second subordinate active layer |
|---|---|---|---|---|---|---|
| Example 11 | 0.5 | 95 | 1 | 2 | 2 | 1:100 |
| Example 12 | 2.5 | 95 | 1 | 2 | 2 | 5:100 |
| Example 13 | 10 | 95 | 1 | 2 | 2 | 20:100 |
| Example 14 | 20 | 95 | 1 | 2 | 2 | 45:100 |
| Example 15 | 20 | 50 | 10 | 20 | 20 | 92:100 |

Preparation of Positive Electrode Plate

A positive electrode active material $LiNi_{0.8}Co_{0.1}Mn_{0.1}O_2$, a conductive agent acetylene black, and a binder PVDF were mixed and dispersed in NMP at a mass ratio 96:2:2. A resulting slurry was applied onto an aluminum foil. The resulting aluminum foil was dried, followed by cold pressing and cutting, to obtain a positive electrode plate.

Preparation of Lithium-Ion Battery

A positive electrode plate, a polyethylene separator, and a negative electrode plate were stacked in sequence to obtain a bare cell. The bare cell was placed in an outer package. After the bare cell was dried, a 1M $LiPF_6$/EC:EMC:DEC (1:1:1) electrolyte was injected, followed by processes of vacuum packaging, standing, formation, and shaping, to obtain a lithium-ion battery. Same amounts of positive electrode active materials were used in lithium-ion batteries of all the examples and comparative examples. The lithium-ion batteries designed based on the usage amounts of the positive electrode active materials had a theoretical nominal capacity of 4.5 Ah.

Tests

Specific Surface Area Test

Specific surface areas of the porous material and the negative electrode plate were obtained through calculation in the multi-point Brunauer-Emmett-Teller method after nitrogen/carbon dioxide isothermal adsorption and desorption curves of the materials were measured with an automatic gas adsorption analyzer.

Oil Absorption Value Test

The oil absorption value was determined using the Gardner-Coleman method. A solvent used was dibutyl phthalate.

Test for Nominal Capacity and Rate Performance

At room temperature, the lithium-ion battery was charged to an upper limit voltage at a rate of 1/3C, and then discharged to a lower limit voltage at rates of 0.33C and 2C separately. A discharge capacity at the rate of 0.33C was used as a nominal capacity reference group. A capacity retention rate of the lithium-ion battery discharged at the rate of 2C was calculated.

Direct Current Internal Resistance Test

At room temperature, the lithium-ion battery was charged to an upper limit voltage at a rate of 1/3C, that is, charged to 100% SOC. Then, the lithium-ion battery was discharged to 50% SOC. After the lithium-ion battery was left standing for 5 min, the lithium-ion battery was discharged for 10 seconds at a rate of 4C, so as to obtain direct current internal resistance DCR of the lithium-ion battery in a state of 50% SOC under room temperature.

Negative Electrode Plate Surface SEM Test

The surface of the negative electrode plate was photographed using a scanning electron microscope, so that distribution and pore diameters of pores in the surface of a negative active substance layer could be observed.

Negative Electrode Plate Cross Section SEM Test

The negative electrode plate was cut in a direction perpendicular to the negative active substance layer. A cut section was photographed using a scanning electron microscope so as to observe distribution of pores in the negative active substance layer, where distance between two end openings of the pore in a direction perpendicular to the active substance layer was y, and length between the two end openings of the pore along an inner wall of the pore was L.

Test data of the negative electrode plates and the lithium-ion batteries of examples 1 to 15 and comparative example 1 is recorded in Table 4.

Table 4 shows performance of the negative electrode plates and the lithium-ion batteries of examples 1 to 15 and comparative example 1. $BET_{CO2}/BET_{N2}$ represents a ratio of a specific surface area of the negative electrode plate in a carbon dioxide atmosphere to a specific surface area of the negative electrode plate in a nitrogen atmosphere.

TABLE 4

Performance of the negative electrode plates and the lithium-ion batteries of examples 1 to 15 and comparative example 1

| Example | $BET_{CO2}/BET_{N2}$ | Nominal capacity at 0.33 C (Ah) | Discharge capacity retention rate at 2 C (%) | Direct current internal resistance (mohm) |
|---|---|---|---|---|
| Example 1 | 8.5 | 4.6 | 97.4 | 11.1 |
| Example 2 | 7.2 | 4.5 | 96.3 | 12.2 |
| Example 3 | 4.8 | 4.6 | 95.2 | 12.7 |
| Example 4 | 13 | 4.4 | 98.2 | 11.0 |
| Example 5 | 11.2 | 4.5 | 97.7 | 10.8 |
| Example 6 | 17.8 | 4.4 | 98.1 | 10.6 |
| Example 7 | 23.6 | 4.4 | 98.5 | 10.1 |
| Example 8 | 3.2 | 4.5 | 89.1 | 12.9 |
| Example 9 | 10.7 | 4.3 | 98.1 | 10.7 |
| Example 10 | 13.6 | 4.0 | 98.8 | 10.6 |
| Example 11 | 3.7 | 4.5 | 91.2 | 12.9 |
| Example 12 | 9.0 | 4.5 | 96.8 | 11.5 |
| Example 13 | 10.3 | 4.3 | 97.9 | 10.9 |
| Example 14 | 12.8 | 4.1 | 98.0 | 10.7 |
| Example 15 | 14.2 | 3.8 | 98.2 | 10.2 |
| Comparative example 1 | 1.1 | 3.3 | 78.3 | 14.7 |

It can be learned from relevant data in Table 2 that compared with the negative electrode plate of comparative example 1, $BET_{CO2}/BET_{N2}$ of the negative electrode plates of examples 1 to 15 fall within a range of 3-24, and the negative electrode plates of examples 1 to 15 have larger specific surface areas and higher porosities. The lithium-ion batteries of examples 1 to 15 have nominal capacities at 0.33C of 3.8 Ah-4.6 Ah, discharge capacity retention rates at 2C of 89.1%-98.8%, and direct current internal resistance of 10.1 mohm-12.9 mohm. Compared with the lithium-ion battery of comparative example 1, the lithium-ion batteries of examples 1 to 15 have higher nominal capacities, higher rate performance, and smaller direct current internal resistance.

It can be learned from examples 5 to 7 that increase in the oil absorption value and specific surface area of the porous material is accompanied by increase in $BET_{CO2}/BET_{N2}$ of the prepared negative electrode plate, and slight decrease in the nominal capacity at 0.33C, increase in the discharge capacity retention rate at 2C, and decrease in the direct current internal resistance of the lithium-ion battery.

It can be learned from examples 8 to 10 that increase in the porous material in the active substance layer is accompanied by increase in $BET_{CO2}/BET_{N2}$ of the prepared negative electrode plate, and decrease in the nominal capacity at 0.33C, increase in the discharge capacity retention rate at 2C, and decrease in the direct current internal resistance of the lithium-ion battery.

In examples 11 to 15, the composition proportions of the first subordinate active layers, the mass percentages of hard carbon in the active substance layers, and the thickness ratios of the first subordinate active layers and the second subordinate active layers are controlled, so that the lithium-ion batteries of examples 1 to 15 have nominal capacities at 0.33C of 3.8 Ah-4.5 Ah, discharge capacity retention rates at 2C of 91.2%-98.2%, and direct current internal resistance of 10.2 mohm-12.9 mohm.

Technical features in the foregoing embodiments may be combined in any way. For brevity of description, possible combinations of the technical features in the foregoing embodiments are not described all. However, as long as there is no contradiction among combinations of these technical features, all the combinations should be considered within a scope recorded in this specification.

The foregoing embodiments only represent several implementations of this application, and descriptions thereof are specific and detailed, but should not be construed as any limitations on the scope of this patent. It should be noted that persons of ordinary skill in the art may further make several modifications and improvements without departing from the concept of this application, and these modifications and improvements also fall within the protection scope of this application. Therefore, the protection scope of this application should be subject to the appended claims.

The invention claimed is:

1. An electrode plate comprising:

a current collector; and an active substance layer, the active substance layer being provided on at least one surface of the current collector, the active substance layer comprising an active main material and a porous material, and the active substance layer having pores, wherein the pore runs through or not through the active substance layer, wherein the active substance layer comprises a first subordinate active layer and a second subordinate active layer that are stacked on the current collector, wherein the first subordinate active layer is located between the current collector and the second subordinate active layer, the first subordinate active layer comprises the porous material, the second subordinate active layer comprises the active main material, and the pore traverses both the first subordinate active layer and the second subordinate active layer and runs through the second subordinate active layer, thickness of the active substance layer is x, and distance between two end openings of the pore in a direction perpendicular to the active substance layer is y, wherein x and y satisfy the following condition: $0.1 \leq x \leq y \leq x$.

2. The electrode plate according to claim 1, wherein length between the two end openings of the pore along an inner wall of the pore is L, wherein L and y satisfy the following condition: $L > y$.

3. The electrode plate according to claim 1, wherein the pore is a non-linear pore.

4. The electrode plate according to claim 1, wherein a projection of interior of the pore on the current collector in the direction perpendicular to the active substance layer does not overlap with the two end openings of the pore.

5. The electrode plate according to claim 1, wherein there are a plurality of pores, and distance between adjacent two of the pores is d, wherein $d \leq 10x$.

6. The electrode plate according to claim 1, wherein a maximum diameter of the pore is 1 μm-50 μm.

7. The electrode plate according to claim 1, wherein the porous material is a porous carbon material.

8. The electrode plate according to claim 7, wherein the porous carbon material is selected from at least one of hard carbon, biomass carbon, activated carbon, carbon fibers, and carbon aerogel.

9. The electrode plate according to claim 1, wherein $D_v50$ of the porous material is 1 μm-100 μm.

10. The electrode plate according to claim 1, wherein a specific surface area of the porous material in a carbon dioxide atmosphere is greater than or equal to 50 $m^2/g$ and/or wherein a ratio of a specific surface area of the electrode plate in a carbon dioxide atmosphere to a specific surface area of the electrode plate in a nitrogen atmosphere is greater than or equal to 3.

11. The electrode plate according to claim 1, wherein an oil absorption value of the porous material is greater than or equal to 30 mL/100 g, wherein the oil absorption value is determined using the Gardner-Coleman method.

12. The electrode plate according to claim 1, wherein the active substance layer, a mass percentage of the porous material is 0.1%-20%.

13. A method for making an electrode plate according to claim 1 comprising the steps of:

preparing an active substance layer on at least one side surface of a current collector, the active substance layer comprising an active main material and a porous material, and the active substance layer having pores, wherein the pore runs through or not through the active substance layer, thickness of the active substance layer is x, and distance between two end openings of the pore in a direction perpendicular to the active substance layer is y, wherein x and y satisfy the following condition: $0.1x \leq y \leq x$;

wherein the step of preparing the active substance layer on at least one side surface of the current collector comprises:

pretreating the porous material so that the porous material adsorbs gas;

preparing a slurry from the active main material and the porous material; and applying the slurry on at least one side surface of the current collector.

14. The method according to claim 13, wherein the step of preparing an active substance layer on at least one side surface of a current collector comprises:

preparing a first subordinate active layer on at least one side surface of the current collector, the first subordinate active layer comprising the porous material with gas adsorbed; and preparing a second subordinate active layer on a surface of the first subordinate active layer away from the current collector, the second subordinate active layer comprising the active main material.

15. The method according to claim 14, wherein before the step of preparing a second subordinate active layer on a surface of the first subordinate active layer away from the current collector, the method further comprises:

pretreating the current collector on which the first subordinate active layer is prepared so that the porous material of the first subordinate active layer adsorbs gas.

16. A secondary battery, comprising at least one of the electrode plate according to claim 1.

17. A battery module comprising the secondary battery according to claim 16.

18. A battery pack comprising the battery module according to claim 17.

19. An electric apparatus comprising at least one of the secondary battery according to claim 16.

* * * * *